United States Patent
Komuro et al.

(10) Patent No.: US 8,119,260 B2
(45) Date of Patent: Feb. 21, 2012

(54) RARE-EARTH MAGNET

(75) Inventors: Matahiro Komuro, Hitachi (JP); Yuichi Satsu, Hitachi (JP); Kunihiro Maeda, Hitachi (JP); Yuzo Kozono, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 11/189,912

(22) Filed: Jul. 27, 2005

(65) Prior Publication Data

US 2006/0022175 A1    Feb. 2, 2006

(30) Foreign Application Priority Data

Jul. 28, 2004 (JP) ................................. 2004-219494
Feb. 24, 2005 (JP) ................................. 2005-048167

(51) Int. Cl.
B32B 15/04 (2006.01)

(52) U.S. Cl. .................. 428/693.1; 428/692.1

(58) Field of Classification Search ............... 428/693.1, 428/636, 692.1, 900
See application file for complete search history.

(56) References Cited

U.S. PATENT DOCUMENTS

| | | | | |
|---|---|---|---|---|
| 4,792,368 A * | 12/1988 | Sagawa et al. | ................ | 148/302 |
| 5,319,653 A | 6/1994 | Favennec | | |
| 5,858,124 A | 1/1999 | Endo et al. | | |
| 6,821,616 B1 * | 11/2004 | Sakurai et al. | ................ | 428/332 |
| 6,960,240 B2 * | 11/2005 | Hirota et al. | ................ | 75/610 |
| 7,179,340 B2 * | 2/2007 | Komuro et al. | ................ | 148/302 |
| 2003/0106615 A1 * | 6/2003 | Hirota et al. | ................ | 148/101 |
| 2003/0136469 A1 | 7/2003 | Makita | | |
| 2004/0210289 A1 * | 10/2004 | Wang et al. | ................ | 607/116 |
| 2005/0081959 A1 | 4/2005 | Kim | | |
| 2005/0284545 A1 * | 12/2005 | Komuro et al. | ................ | 148/302 |
| 2007/0134519 A1 * | 6/2007 | Komuro et al. | ............ | 428/841.2 |

FOREIGN PATENT DOCUMENTS

| | | | |
|---|---|---|---|
| EP | 0 994 493 B1 | | 4/2000 |
| JP | 2-026824 | | 1/1990 |
| JP | 06-231925 | | 8/1994 |
| JP | 06231925 A | * | 8/1994 |
| JP | 07-069621 | | 3/1995 |
| JP | 9-186010 | | 7/1997 |
| JP | 10-163055 | | 6/1998 |
| JP | 2000-034502 | | 2/2000 |
| JP | 2000034502 A | * | 2/2000 |

(Continued)

OTHER PUBLICATIONS

Japanese machine translation of Sagawa JP 2003282312A, Published Oct. 3, 2003.*

(Continued)

Primary Examiner — Mark Ruthkosky
Assistant Examiner — Gary Harris
(74) Attorney, Agent, or Firm — Antonelli, Terry, Stout & Kraus, LLP.

(57) ABSTRACT

In a ferromagnetic material containing at least one kind of rare-earth element, a layer containing at least one kind of alkaline earth element or rare-earth element and fluorine is formed at the grain boundary or near the powder surface of the ferromagnetic material. A further layer containing at least one kind of rare-earth element, having a fluorine concentration lower than that of the layer described first and having a rare-earth element concentration higher than that of the host phase of the ferromagnetic material, or an oxide layer containing a rare-earth element is formed in adjacent with a portion of the layer described first.

4 Claims, 3 Drawing Sheets

FOREIGN PATENT DOCUMENTS

| | | |
|---|---|---|
| JP | 2003-282312 | 10/2003 |
| JP | 2003282312 A * | 10/2003 |
| JP | 2006-320036 | 11/2006 |

OTHER PUBLICATIONS

Japanese Office Action and partial translation; Application No. 2005-048167; drafted: Sep. 30, 2009; 4 pages total.

German Office Action and translation; Application No. 10 2005 035 446.7-24; dated Oct. 28, 2009; 5 page total.

U.S. Appl. No. 11/356,096, filed Feb. 2006, Hitachi Ltd.
U.S. Appl. No. 11/354,091, filed Jun. 2005, Hitachi Ltd.
U.S. Appl. No. 11/525,928, filed Sep. 25, 2006, Komuro et al.
U.S. Appl. No. 11/524,289, filed Sep. 21, 2006, Satsu et al.
U.S. Appl. No. 11/157,816, filed Jun. 22, 2005, Hitachi, Ltd.

* cited by examiner

US 8,119,260 B2

RARE-EARTH MAGNET

CLAIM OF PRIORITTY

The present application claims priority from Japanese application serial No. 2005-48167, filed on Feb. 24, 2005, and Japanese application serial no. 2004-219494, filed on Jul. 28, 2004, the content of which are hereby incorporated by reference into this application.

FIELD OF THE INVENTION

The present invention relates to a rare-earth magnet, a manufacturing method thereof.

BACKGROUND OF THE INVENTION

Conventional rare-earth sintered magnets containing fluorine-compounds are described in Japanese Patent Laid-Open No. 2003-282312. In the prior art, the fluorine-compound constitutes a granular grain boundary phase, and is not formed at the grain boundary or along the powder surface of the magnet. It does not disclose that a fluorine-containing layer is formed continuously and a further layer is in adjacent with the fluorine-containing layer, with an aim of reducing eddy current and ensuring energy product.

SUMMARY OF THE INVENTION

For the invention of the prior art, Table 3 describes magnetic characteristics of a sintered magnet prepared by adding $DyF_3$ as a fluorine-compound to a powder for an NdFeB sintered magnet. In a case of adding $DyF_3$ by 5% by weight, the value for residual magnetic flux density (Br) is 11.9 kG, which is decreased by about 9.8% compared with a value with no such addition (13.2 kG). Due to the decrease of the residual magnetic flux density, energy product $((BH)_{MAX})$ also is decreased remarkably. Accordingly, since the energy product is small although the coercive force increases, it is difficult to be used in a magnetic circuit requiring high magnetic flux. Further, in the prior art invention, the fluorine-containing compound is formed discontinuously and the effect of reducing the eddy current loss can not be expected.

The present invention is characterized as follows. A ferromagnetic material powder contains at least one kind of rare-earth element; a layer (first layer) containing at least one alkaline earth element or rare-earth element and fluorine is formed at the grain boundary or near the powder surface of the ferromagnetic material; and a further layer (second layer) containing at least one kind of rare-earth element with the fluorine concentration being lower than that of the first layer and the concentration of the rare-earth element being higher than that of the host phase of the ferromagnetic material, or an oxide layer containing a rare-earth element is formed in adjacent with a portion of the first layer.

The present invention is applicable to a magnetic circuit exposed to high frequency magnetic fields and it can expect for improving the overeall efficiency, as well as an effect of reducing noises of the magnetic circuit due to the effect of reducing the loss and the effect of suppressing heat generation.

DESCRIPTION OF THE PREFERRED EMBODIMENT

Figure 1:
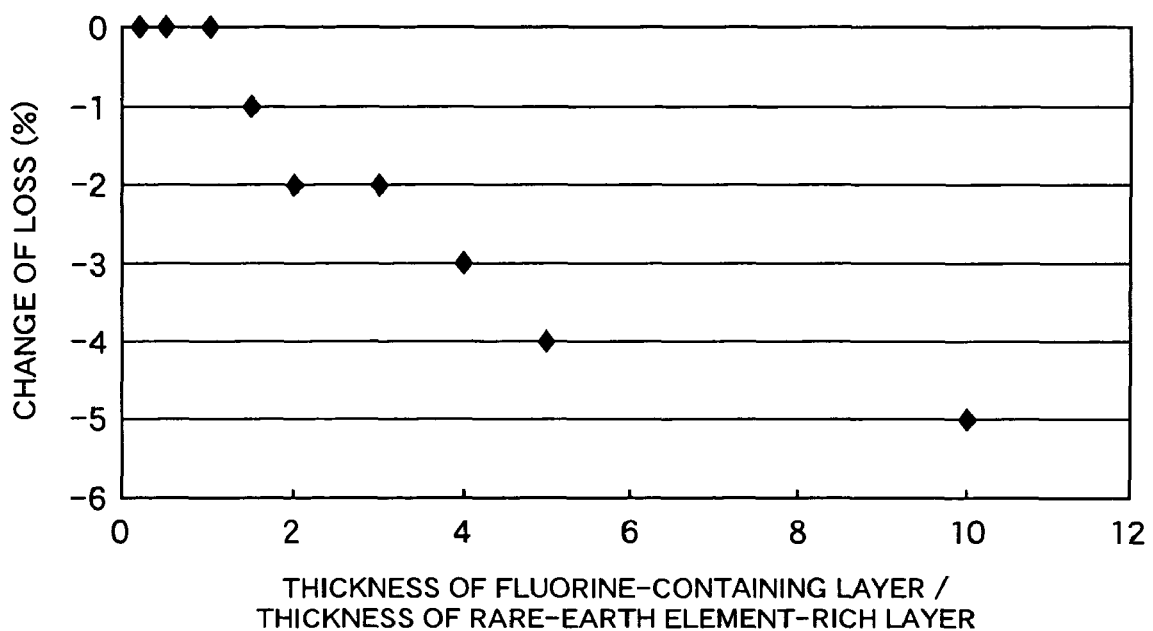
FIG. 1 shows a relation between the loss and the thickness ratio for fluorine-containing layer/rare-earth element-rich layer.

For attaining the foregoing purpose, it is necessary to form a fluorine-containing layer at the grain boundary or along the powder surface while maintaining magnetic characteristics. In a case of an NdFeB magnet, $Nd_2Fe_{14}B$ constitutes a host phase and an Nd phase and $Nd_{1.1}Fe_4B_4$ phase are present in the phase diagram. When an NdFeB composition is optimized and heated, the Nd phase or NdFe alloy phase is formed at the grain boundary. The phase containing Nd at high concentration is liable to be oxidized to form a partially oxidized layer. The fluorine-containing layer is formed on the outside of the Nd phase, the NdFe alloy layer or Nd oxide layer in view of the host phase. The fluorine-containing layer contains a phase in which at least one element of alkaline earth metal or rare-earth element is bonded with fluorine. The fluorine-containing layer is formed in contact with the $Nd_2Fe_{14}B$, Nd phase, NdFe phase, or Nd oxide layer. Nd or NdFe phase has a lower melting point than $Nd_2Fe_{14}B$, and tends to be diffused and changed the structure easily by heating. It is important to increase the average thickness of the layer containing fluorine and the alkaline earth or rare-earth element to more than the thickness of the Nd, NdFe phase or Nd oxide layer. Such thickness can reduce the eddy current loss and provide high magnetic characteristics. Nd phase or NdFe phase ($Nd_{95}Fe_5$) is formed at the grain boundary at an eutectic temperature of 665° C. and for, making the fluorine-containing layer stable also at that temperature, it is necessary to increase the thickness to larger than the thickness of the Nd phase or NdFe phase ($Nd_{95}Fe_5$) Such thickness can improve the thermal stability of the fluorine-containing layer, and prevent introduction of defects from the adjacent layer or instabilization such as discontinuity of the layer by heating. Further, a ferromagnetic material powder containing at least one kind of rare-earth element such as NdFeB series tends to be oxidized since it contains a rare-earth element. For facilitating the handling, magnet is sometimes prepared by using an oxidized powder. As the thickness of the oxide layer increases, the magnetic characteristics are deteriorated and the stability of the fluorine-containing layer is lowered as well. As the thickness of the oxide layer increases, structural change is observed in the fluorine-containing layer the fluorine at a heat treatment temperature of 400° C. or higher. Diffusion and alloying (diffusion and alloying between fluoride and oxide) occur between the fluorine-containing layer and the oxide layer.

The material to which the invention is applicable is to be described. The fluorine-containing layer comprises $CaFe_2$, $MgFe_2$, $CeF_3$, $PrF_3$, $NdF_3$, $NdF_2$, $SmF_3$, $EuF_3$, $GdF_3$, $TbF_3$, $DyF_3$, $HoF_3$, $ErF_3$, $YbF_3$, and $LuF_3$, as well as amorphous materials comprising the composition of such fluorine-compounds, fluorine-compounds comprising plural elements constituting the fluorine-compounds described above, composite fluorine-compounds in which oxygen, nitrogen, or carbon is mixed to the fluorine-compounds described above, fluorides in which constituent elements containing impurities contained in the main phase are mixed with the fluorides described above or fluorine-compounds at a lower fluorine concentration than the fluorine-compounds described above. The fluorine-containing layer can be formed along the surface of the powder by a method such as a sputtering method, vapor deposition method, flame spraying or a coating method utilizing a solution to the surface of the powder showing ferromagnetic characteristics. The fluorine-containing layer can be formed by the step either before heat treatment or after heat treatment for increasing the coercive force. After covering the surface of the powder with the fluorine-containing layer, an anisotropic magnetic is prepared by magnetic field orientation and molding by heating. An isotropic magnet can be also prepared without applying the magnetic fields for providing anisotropy. Further, a bond magnet can be prepared by increasing the coercive force of a powder coated with the fluorine-containing layer by heating at a heat treatment temperature of 1200° C. or lower, and mixing the same with an organic material to prepare a compound. For the ferromagnetic material containing rare-earth element, a powder with addition of $Nd_2Fe_{14}B$, $(Nd, Dy)_2Fe_{14}B$, $Nd_2(Fe, Co)_{14}B$, $(Nd, Dy)_2(Fe, Co)_{14}B$, or powder of NdBeB series with addition of Ga, Mo, V, Cu, Zr, Tb, or Pr, $Sm_2(Co, Fe, Cu, Zr)_{17}$ as $Sm_2Co_{17}$ series, $Sm_2Fe_{17}N_3$, etc., can be used.

Examples of the present invention are to be described with reference to the drawings.

EXAMPLE 1

An NdFeB alloy powder comprises $Nd_2Fe_{14}B$ as a host phase in which an Nd rich phase is grown at a grain boundary of the main phase, with a grain size of 1 to 10 μm. $NdF_3$ is thermal-sprayed onto the surface of such a ferromagnetic powder by plasma spraying etc. The $NdF_3$ powder to be thermal sprayed has a powder diameter of 10 to 100 nm, and an $NdF_3$ layer is formed on the surface of the ferromagnetic powder while moving the surface to be sprayed. Ar is used as a thermal spraying gas. $NdF_3$ powder is thermal-sprayed onto the surface of the ferromagnetic powder while getting exposed to plasma. Those powders are heated in an inert atmosphere up to 200° C. to 300° C., pressed while getting orientated in magnetic fields, heated further and baked at 600 to 900° C. After baking, plural cross sections of the baked powders were evaluated with a transmission electron microscope or scanning electron microscope. As a consequence, it is confirmed that a rare-earth element-rich layer or an oxygen-rich layer was formed substantially along the outer periphery of the base material powder. Further, a fluorine-containing layer as fluorine-rich layer is formed entirely or partially on an outer surface of the rare-earth element-rich layer or the oxygen-rich layer. The concentration of the rare-earth element in the rare-earth element-rich layer is higher than an average concentration of rare-earth element of a compound in the host phase. In the case of forming the oxygen-rich layer, the oxygen concentration is higher than the average oxygen concentration of the host phase. In $Nd_2Fe_{14}B$, the rare-earth element-rich layer is close to non-magnetic properties of $Nd_{95}Fe_5$ or Nd, and its crystal structure is also different from the host phase. On the other hand, the oxygen-rich layer contains a phase in which constituent elements existing in the vicinity of the rare-earth element-rich layer are bonded with oxygen. In the rare-earth element-rich layer or the oxygen-rich layer, increase of its thickness results in deterioration of magnetic characteristics such as decrease of a residual magnetic flux density. The thickness of the rare-earth element-rich layer is preferably from 0.1 to 100 nm. In a case where the thickness of the rare-earth element-rich layer is 2 nm in average, each powder which consists of the fluorine-containing layer and the rare-earth element-rich is prepared by changing the thickness of the fluorine-containing layer under control of thermal spray time; a surface magnet rotor is prepared by using the powder; and a relation between the loss and the thickness ratio for fluorine-containing layer/rare-earth element-rich layer is as shown as in FIG. 1. Evaluation of FIG. 1 was conducted while controlling a gap such that the gap magnetic flux density was identical. The loss was decreased in a case where the thickness ratio in FIG. 1 exceeds 1 and the effect of decreasing the loss was not observed at the thickness ratio of 1 or less. In a case where the fluorine-containing layer is thin and when it is thinner than the rare-earth element-rich layer, the fluorine-containing layer does not form a continuous layer, and the powder or grain of the rare-earth element-rich layer can not be covered completely by the fluorine containing layer. On the contrary, as the thickness of the fluorine-containing layer increases to larger than the rare-earth element-rich layer, it tends to form a continuous layer. The fluorine-containing layer is a layer where the rare-earth element is present by about 95%; the fluorine-containing layer corresponds to a layer containing 10 (atom) % or more of fluorine, preferably, and it is a layer containing 50% or more of fluorine. In a case where the thickness of the rare-earth element-rich layer increases to larger than that of the fluorine-containing layer, the fluorine-containing layer tends to be thermally instable and the continuity tends to be destructed by stressor diffusion. The loss is decreased more when the thickness of the fluorine-containing layer is larger than that of the oxygen-rich layer. Therefore, it is preferred that the thickness of the oxygen-rich layer is less than that of the fluorine-containing layer as fluorine-rich layer. In this case, as oxygen is also contained in the fluorine-containing layer, both fluorine and oxygen are contained in the fluorine-containing layer.

EXAMPLE 2

An NdFeB alloy powder is a powder which is pulverized into an average grain size of 1 to 10 μm, and $NdF_3$ is sputtered onto the surface of the NdFeB powder. A fluorine-containing layer is formed on the surface of the NdFeB alloy powder by using a target molded from an $NdF_3$ powder in an argon gas or a gas mixture atmosphere of argon and fluorine. If sputtering inversely on the powder surface before sputtering of the fluoride, the oxide layer is removed and on the powder surface can be cleaned. The NdFeB alloy powder undergoes vibration or rotational movement to form a layer containing a fluoride or fluorine over the entire NdFeB powder surface. A phase of 1 to 10 nm with a rare-earth element composition different from that of the host phase is present on the surface of the NdFeB alloy powder, and an oxide layer is often present in the vicinity thereof. The thickness of the phase with the rare-earth element composition different from the host phase and the thickness of the oxide layer are different locally. The thicknesses of them are from 100 to 1000 nm in a case where the powder is not uniform. It is necessary that the thickness of the fluorine-containing layer to be formed on the surface of the NdFeB powder is thicker than 1 to 10 nm or more which is the thickness of the layer with the rare-earth element composition different from the host phase. In a case of applying a heat treatment to the NdFeB powder at 600° C. or higher in order to ensure the magnetic characteristics after forming the fluorine-containing layer, the fluorine-containing layer desirably has a thickness larger than the thickness of the oxide layer for the aim of reducing the loss. Because the oxide layer and the layer with rare-earth element composition different from the host phase tend to diffuse into the fluorine-containing layer at a temperature of 600° C. or higher, and the fluorine-containing layer results in the change of the structure. Accordingly, if the fluorine-containing layer does not have an enough thickness, continuity and a crystal structure thereof can no more be maintained near the boundary with the fluorine-containing layer due to defects, intrusion of oxygen, diffusion of rare-earth elements, etc. In a case where the thickness of the oxide layer is 1000 nm or more, it is desirable that the thickness of the fluorine-containing layer is thicker than that. The fluorine-containing layer comprises a mixed phase of $NdF_3$ and $NdF_2$ containing amorphous in view of the structure just after formation by sputtering or like other means. But the fluorine-containing layer can contain only amorphous, only $NdF_3$ or only $NdF_2$ by controlling the forming conditions. After formation of the fluorine-containing layer, a heat treatment is applied to it within a temperature of from 600° C. to 1200° C. In this case, the structure near a boundary of the fluorine-containing layer and the layer in contact with the fluorine-containing layer changes greatly. The layer with the rare-earth element composition different from the host phase grows further as the heat treatment temperature is higher, and oxygen of the oxide layer diffuses to both of the fluorine-containing layer and the layer with the rare-earth element composition different from the host phase. In a case where each thickness of those layers is respectively larger than 100 nm, the thicker the thickness of them, the magnetic characteristic of the NdFeB alloy powder is deteriorated more. Accordingly, also the thickness of the fluorine-containing layer must be determined in consideration of necessary magnetic characteristic. The fluorine-containing layer can be formed along the powder surface of the NdFeB alloy powder, and the distribution of the thickness is within a range from +200% to −50%. In a case of forming a magnet, for example, by baking the NdFeB alloy powder with the fluorine-containing layer, the thickness of the fluorine-containing layer is preferably 10,000 nm or less in average. The stability of the fluorine-containing layer can be increased by mixing a fluoride powder into the fluorine-containing layer before baking. In such a mixing case, a thicker fluorine-containing portion is formed locally due to contact of the fluorine-containing layer and the fluoride powder. The thickness of the fluorine-containing layer formed along the NdFeB powder is preferably 10,000 nm or less in average. The energy product is deteriorated remarkably when the thickness is thicker than 10,000 nm.

EXAMPLE 3

Figure 2:
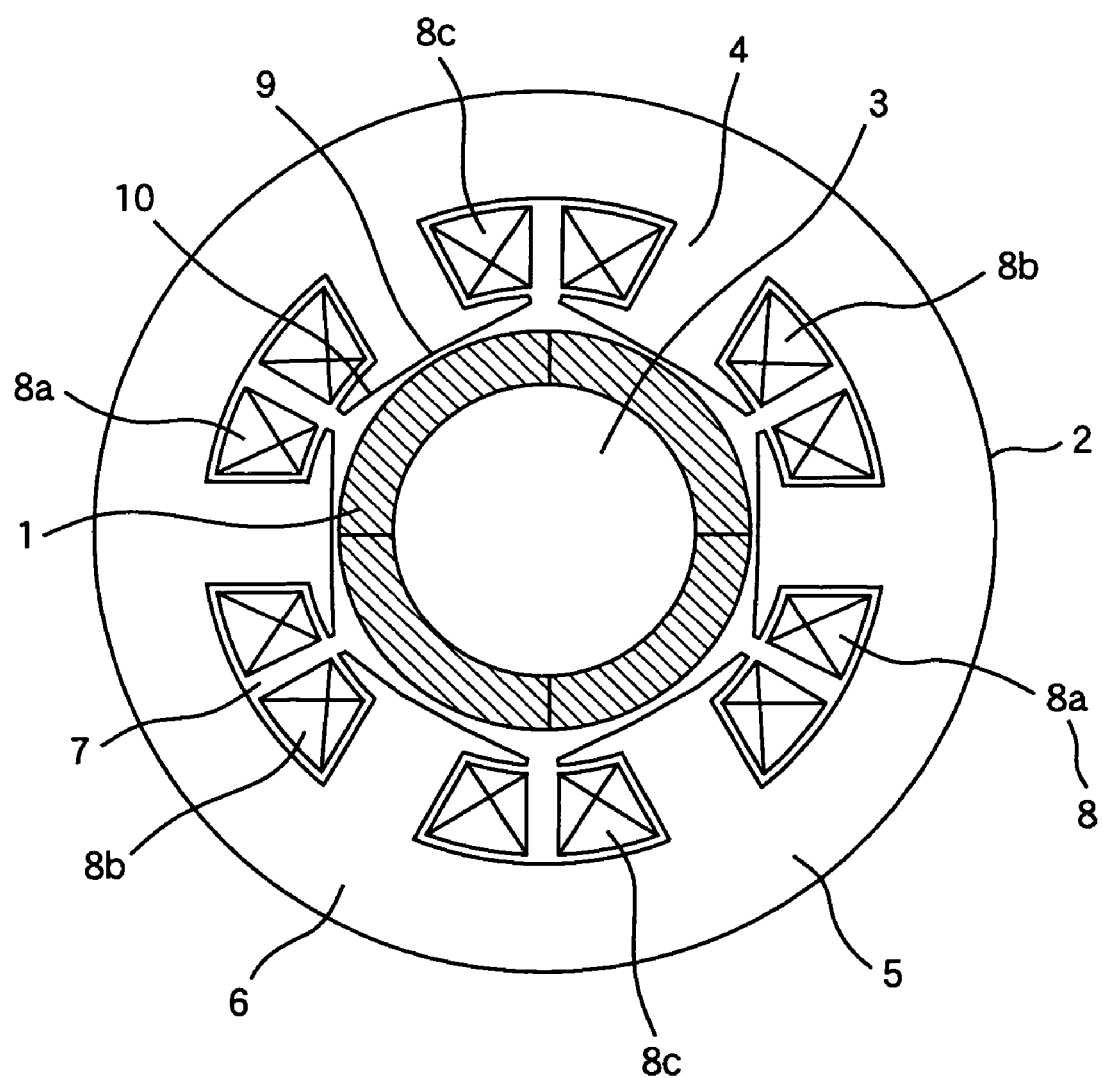
FIG. 2 is a cross sectional view of a rotary machine.

For ferromagnetic powder containing at least one kind of rare-earth element such as an NdFeB powder, a fluorine-containing layer is formed on the surface of the ferromagnetic powder by using a solution containing at least one kind of alkaline earth element or rare-earth element, and fluorine. The fluorine-containing layer is grown entirely or partially on the surface of the ferromagnetic powder in the solution, and the grown fluorine-containing layer is formed along the powder surface. After removing the solvent from the powder surface, the ferromagnetic magnetic powder is heated at 600 to 1100° C., to increase a coercive force. After confirming that it exhibits a predetermined coercive force, it is oriented under magnetic fields, and molded by heating to obtain a molded product at a density of 90% or more. The molded product is magnetized to obtain a magnet. After increasing the coercive force, an organic material and a ferromagnetic powder formed with a fluorine-containing layer on the surface are kneaded, and they are molded under heating to form a bond magnet. In a case of growing the fluorine-containing layer on the surface or at the grain boundary of the NdFeB powder by using the solution, the fluorine-containing layer is not directly grown on the host phase. More specifically, the fluorine-containing layer is grown on the oxide layer as a primary coating previously formed, or the fluorine-containing layer is grown on the layer with the rare-earth composition different from the host phase as a primary coating. After once forming the fluorine-containing layer on the primary coating, a portion of the oxide layer as the primary coating is mixed with the fluorine-containing layer by the heat treatment, or a portion of the layer with the rare-earth composition different from the host phase causes inter-diffusion with the fluorine-containing layer by the heat treatment. Accordingly, the fluorine-containing layer increases in thickness. While the relation between the thickness of the whole primary coating and the thickness of the fluorine-containing layer changes by thermal hysteresis due to the heat treatment or the like, and the effect of reducing the loss is not remarkable in a case where the thickness of the fluorine-containing layer is thicker than the thickness of the primary coating as shown in FIG. 1. The relation of those thicknesses is that at a relatively flat place on the powder surface or grain boundary surface, but it is not a relation at a special place such as grain boundary triple points or protrusion portion of the powder. Here, the relatively flat place is a portion not having sharp angle of the powder, and it is a place where the thickness is within a range of −50% to +200% of the average thickness. In a case of forming the fluorine-containing layer by using the solution, it is possible that the area within the above-mentioned range of the thickness can be 50% or more for the area applied with the whole surface treatment. For a magnet prepared by forming the fluorine-containing layer with 1000 nm thickness in average with the thickness of the primary coating being 1 to 20 nm by using the solution and by shaping the powder under heating, a rotary machine as shown in FIG. 2 was manufactured and the loss was evaluated. The results are shown Table 1 and Table 2.

TABLE 1

| Host phase | Primary coating on surface | Fluorine-containing layer | Change of loss (%) |
|---|---|---|---|
| $Nd_2Fe_{14}B$ | Nd, $Nd_{95}Fe$, $Nd_2O_3$ | $BaF_2$ | −0.5 |
| $Nd_2Fe_{14}B$ | Nd, $Nd_{95}Fe$, $Nd_2O_3$ | $CaF_2$ | −0.5 |
| $Nd_2Fe_{14}B$ | Nd, $Nd_{95}Fe$, $Nd_2O_3$ | $MgF_2$ | −0.4 |
| $Nd_2Fe_{14}B$ | Nd, $Nd_{95}Fe$, $Nd_2O_3$ | $SrF_2$ | −0.5 |
| $Nd_2Fe_{14}B$ | Nd, $Nd_{95}Fe$, $Nd_2O_3$ | LiF | −0.5 |
| $Nd_2Fe_{14}B$ | Nd, $Nd_{95}Fe$, $Nd_2O_3$ | $LaF_3$ | −0.7 |
| $Nd_2Fe_{14}B$ | Nd, $Nd_{95}Fe$, $Nd_2O_3$ | $NdF_3$ | −4.5 |
| $Nd_2Fe_{14}B$ | Nd, $Nd_{95}Fe$, $Nd_2O_3$ | $PrF_3$ | −2.5 |
| $Nd_2Fe_{14}B$ | Nd, $Nd_{95}Fe$, $Nd_2O_3$ | $SmF_3$ | −2.4 |
| $Nd_2Fe_{14}B$ | Nd, $Nd_{95}Fe$, $Nd_2O_3$ | $EuF_3$ | −2.1 |
| $Nd_2Fe_{14}B$ | Nd, $Nd_{95}Fe$, $Nd_2O_3$ | $GdF_3$ | −2.0 |
| $Nd_2Fe_{14}B$ | Nd, $Nd_{95}Fe$, $Nd_2O_3$ | $TbF_3$ | −3.3 |

TABLE 1-continued

| Host phase | Primary coating on surface | Fluorine-containing layer | Change of loss (%) |
|---|---|---|---|
| $Nd_2Fe_{14}B$ | $Nd, Nd_{95}Fe, Nd_2O_3$ | $DyF_3$ | −2.5 |
| $Nd_2Fe_{14}B$ | $Nd, Nd_{95}Fe, Nd_2O_3$ | $CeF_3$ | −2.5 |
| $Nd_2Fe_{14}B$ | $Nd, Nd_{95}Fe, Nd_2O_3$ | $HoF_3$ | −2.0 |
| $Nd_2Fe_{14}B$ | $Nd, Nd_{95}Fe, Nd_2O_3$ | $ErF_3$ | −2.0 |
| $Nd_2Fe_{14}B$ | $Nd, Nd_{95}Fe, Nd_2O_3$ | $TmF_3$ | −1.5 |
| $Nd_2Fe_{14}B$ | $Nd, Nd_{95}Fe, Nd_2O_3$ | $YbF_3$ | −1.0 |
| $Nd_2Fe_{14}B$ | $Nd, Nd_{95}Fe, Nd_2O_3$ | $PmF_3$ | −0.7 |
| $Nd_2Fe_{14}B$ | $Nd, Nd_{95}Fe, Nd_2O_3$ | $NdF_3, NdF_2$ | −4.4 |
| $Nd_2Fe_{14}B$ | $Nd, Nd_{95}Fe, Nd_2O_3$ | $NdF_3, NdF_2, Nd(F, O)_3$ | −4.2 |
| $Nd_2Fe_{14}B$ | $Nd, Nd_{95}Fe, Nd_2O_3$ | $NdF_3, Nd(F, O)_2, Nd(F, O)_3$ | −4.0 |
| $Nd_2Fe_{14}B$ | $Nd_{95}Fe$ | $TbF_3$ | −3.1 |
| $Nd_2Fe_{14}B$ | $Nd_{95}Fe$ | $DyF_3$ | −2.2 |
| $Nd_2Fe_{14}B$ | $Nd_{95}Fe$ | $NdF_3, NdF_2$ | −3.1 |
| $Nd_2Fe_{14}B$ | $Nd_{95}Fe$ | $NdF_3, NdF_2, Nd(F, O)_3$ | −3.0 |
| $Nd_2Fe_{14}B$ | $Nd_{95}Fe$ | $NdF_3, Nd(F, O)_2, Nd(F, O)_3$ | −2.6 |
| $(Nd, Dy)_2Fe_{14}B$ | $(Nd, Dy)_{95}Fe$ | $TbF_3$ | −3.2 |
| $(Nd, Dy)_2Fe_{14}B$ | $(Nd, Dy)_{95}Fe$ | $DyF_3$ | −2.4 |
| $(Nd, Dy)_2Fe_{14}B$ | $(Nd, Dy)_{95}Fe$ | $NdF_3, NdF_2$ | −3.1 |
| $(Nd, Dy)_2Fe_{14}B$ | $(Nd, Dy)_{95}Fe$ | $NdF_3, NdF_2, Nd(F, O)_3$ | −3.2 |
| $(Nd, Dy)_2Fe_{14}B$ | $(Nd, Dy)_{95}Fe$ | $NdF_3, Nd(F, O)_2, Nd(F, O)_3$ | −2.9 |
| $Nd_2(Fe, Co)_{14}B$ | $Nd_{95}Fe$ | $TbF_3$ | −3.4 |
| $Nd_2(Fe, Co)_{14}B$ | $Nd_{95}Fe$ | $DyF_3$ | −2.6 |
| $Nd_2(Fe, Co)_{14}B$ | $Nd_{95}Fe$ | $NdF_3, NdF_2$ | −3.2 |
| $Nd_2(Fe, Co)_{14}B$ | $Nd_{95}Fe$ | $NdF_3, NdF_2, Nd(F, O)_3$ | −3.3 |
| $Nd_2(Fe, Co)_{14}B$ | $Nd_{95}Fe$ | $NdF_3, Nd(F, O)_2, Nd(F, O)_3$ | −3.1 |
| $(Nd, Dy)_2(Fe, Co)_{14}B$ | $(Nd, Dy)_{95}(Fe, Co)$ | $TbF_3$ | −3.1 |
| $(Nd, Dy)_2(Fe, Co)_{14}B$ | $(Nd, Dy)_{95}(Fe, Co)$ | $DyF_3$ | −2.4 |
| $(Nd, Dy)_2(Fe, Co)_{14}B$ | $(Nd, Dy)_{95}(Fe, Co)$ | $NdF_3, NdF_2$ | −3.0 |
| $(Nd, Dy)_2(Fe, Co)_{14}B$ | $(Nd, Dy)_{95}(Fe, Co)$ | $NdF_3, NdF_2, Nd(F, O)_3$ | −2.9 |
| $(Nd, Dy)_2(Fe, Co)_{14}B$ | $(Nd, Dy)_{95}(Fe, Co)$ | $NdF_3, Nd(F, O)_2, Nd(F, O)_3$ | −2.9 |
| $Nd_2Fe_{14}(B, C)$ | $Nd_{95}Fe$ | $TbF_3$ | −2.9 |

TABLE 2

| Host phase | Primary coating on surface | Fluorine-containing layer | Change of loss (%) |
|---|---|---|---|
| $Nd_2Fe_{14}(B, C)$ | $Nd_{95}Fe$ | $DyF_3$ | −2.2 |
| $Nd_2Fe_{14}(B, C)$ | $Nd_{95}Fe$ | $NdF_3, NdF_2$ | −2.7 |
| $Nd_2Fe_{14}(B, C)$ | $Nd_{95}Fe$ | $NdF_3, NdF_2, Nd(F, O)_3$ | −2.5 |
| $Nd_2Fe_{14}(B, C)$ | $Nd_{95}Fe$ | $NdF_3, Nd(F, O)_2, Nd(F, O)_3$ | −2.4 |
| $Nd_2(Fe, Co, Zr)_{14}B$ | $Nd_2(Fe, Co, Zr, O)_{14}B$ | $TbF_3$ | −2.1 |
| $Nd_2(Fe, Co, Zr)_{14}B$ | $Nd_2(Fe, Co, Zr, O)_{14}B$ | $DyF_3$ | −1.5 |
| $Nd_2(Fe, Co, Zr)_{14}B$ | $Nd_2(Fe, Co, Zr, O)_{14}B$ | $NdF_3, NdF_2$ | −1.8 |
| $Nd_2(Fe, Co, Zr)_{14}B$ | $Nd_2(Fe, Co, Zr, O)_{14}B$ | $NdF_3, NdF_2, Nd(F, O)_3$ | −2.2 |
| $Nd_2(Fe, Co, Zr)_{14}B$ | $Nd_2(Fe, Co, Zr, O)_{14}B$ | $NdF_3, Nd(F, O)_2, Nd(F, O)_3$ | −2.8 |
| $Nd_2(Fe, Co, Zr)_{14}B$ | $Nd_2(Fe, Co, Zr, O, H)_{14}B$ | $TbF_3$ | −1.9 |
| $Nd_2(Fe, Co, Zr)_{14}B$ | $Nd_2(Fe, Co, Zr, O, H)_{14}B$ | $DyF_3$ | −2.4 |
| $Nd_2(Fe, Co, Zr)_{14}B$ | $Nd_2(Fe, Co, Zr, O, H)_{14}B$ | $NdF_3, NdF_2$ | −2.3 |
| $Nd_2(Fe, Co, Zr)_{14}B$ | $Nd_2(Fe, Co, Zr, O, H)_{14}B$ | $NdF_3, NdF_2, Nd(F, O)_3$ | −2.8 |
| $Nd_2(Fe, Co, Zr)_{14}B$ | $Nd_2(Fe, Co, Zr, O, H)_{14}B$ | $NdF_3, Nd(F, O)_2, Nd(F, O)_3$ | −2.5 |
| $Nd_2(Fe, Co, Ga)_{14}B$ | $Nd_{95}(Fe, Co, Ga)$ | $TbF_3$ | −2.6 |
| $Nd_2(Fe, Co, Ga)_{14}B$ | $Nd_{95}(Fe, Co, Ga)$ | $DyF_3$ | −2.5 |
| $Nd_2(Fe, Co, Ga)_{14}B$ | $Nd_{95}(Fe, Co, Ga)$ | $NdF_3, NdF_2$ | −3.0 |
| $Nd_2(Fe, Co, Ga)_{14}B$ | $Nd_{95}(Fe, Co, Ga)$ | $NdF_3, NdF_2, Nd(F, O)_3$ | −3.5 |
| $Nd_2(Fe, Co, Ga)_{14}B$ | $Nd_{95}(Fe, Co, Ga)$ | $NdF_3, Nd(F, O)_2, Nd(F, O)_3$ | −3.3 |
| $Sm_2Fe_{17}$ | $Sm_2(Fe, O)_{17}$ | $TbF_3$ | −1.5 |
| $Sm_2Fe_{17}$ | $Sm_2(Fe, O)_{17}$ | $DyF_3$ | −1.6 |
| $Sm_2Fe_{17}$ | $Sm_2(Fe, O)_{17}$ | $NdF_3, NdF_2$ | −1.9 |
| $Sm_2Fe_{17}$ | $Sm_2(Fe, O)_{17}$ | $NdF_3, NdF_2, Nd(F, O)_3$ | −1.4 |
| $Sm_2Fe_{17}$ | $Sm_2(Fe, O)_{17}$ | $NdF_3, Nd(F, O)_2, Nd(F, O)_3$ | −1.5 |
| $Sm_2(Co, Fe, Cu, Zr)_{17}$ | $Sm(Co, Fe, Cu, Zr)_5$ | $TbF_3$ | −1.6 |
| $Sm_2(Co, Fe, Cu, Zr)_{17}$ | $Sm(Co, Fe, Cu, Zr)_5$ | $DyF_3$ | −1.7 |
| $Sm_2(Co, Fe, Cu, Zr)_{17}$ | $Sm(Co, Fe, Cu, Zr)_5$ | $NdF_3, NdF_2$ | −1.9 |
| $Sm_2(Co, Fe, Cu, Zr)_{17}$ | $Sm(Co, Fe, Cu, Zr)_5$ | $NdF_3, NdF_2, Nd(F, O)_3$ | −1.4 |
| $Sm_2(Co, Fe, Cu, Zr)_{17}$ | $Sm(Co, Fe, Cu, Zr)_5$ | $NdF_3, Nd(F, O)_2, Nd(F, O)_3$ | −1.3 |
| $Sm_2(Co, Fe, Cu, Zr)_{17}$ | $Sm_2(Co, Fe, Cu, Zr, O)_{17}$ | $TbF_3$ | −1.7 |
| $Sm_2(Co, Fe, Cu, Zr)_{17}$ | $Sm_2(Co, Fe, Cu, Zr, O)_{17}$ | $DyF_3$ | −1.8 |
| $Sm_2(Co, Fe, Cu, Zr)_{17}$ | $Sm_2(Co, Fe, Cu, Zr, O)_{17}$ | $NdF_3, NdF_2$ | −1.8 |
| $Sm_2(Co, Fe, Cu, Zr)_{17}$ | $Sm_2(Co, Fe, Cu, Zr, O)_{17}$ | $NdF_3, NdF_2, Nd(F, O)_3$ | −1.6 |
| $Sm_2(Co, Fe, Cu, Zr)_{17}$ | $Sm_2(Co, Fe, Cu, Zr, O)_{17}$ | $NdF_3, Nd(F, O)_2, Nd(F, O)_3$ | −1.5 |
| $Sm_2Fe_{17}N_3$ | $Sm_2Fe_{17}(N, O)_3$ | $TbF_3$ | −1.5 |
| $Sm_2Fe_{17}N_3$ | $Sm_2Fe_{17}(N, O)_3$ | $DyF_3$ | −1.6 |
| $Sm_2Fe_{17}N_3$ | $Sm_2Fe_{17}(N, O)_3$ | $NdF_3, NdF_2$ | −1.4 |

TABLE 2-continued

| | | | |
|---|---|---|---|
| $Sm_2Fe_{17}N_3$ | $Sm_2Fe_{17}(N, O)_3$ | $NdF_3, NdF_2,$ $Nd(F, O)_3$ | −1.6 |
| $Sm_2Fe_{17}N_3$ | $Sm_2Fe_{17}(N, O)_3$ | $NdF_3, Nd(F, O)_2,$ $Nd(F, O)_3$ | −1.6 |

FIG. 2 shows a radial cross sectional shape of a rotary machine according to the invention. In FIG. 2, a stator 2 of the rotary machine has a stator core 6 comprising teeth 4 and a core back 5, and armature windings 8 in concentrated windings (comprising U-phase windings 8a, V-phase windings 8b, and W phase windings 8C of three-phase windings) wound so as to surround the teeth 4 in the slot 7 between the teeth 4. Since the rotary machine has 4-pole and 6 slots, the slot pitch is 120 degree of electrical angle. A rotor is inserted into a shaft hole or rotor insertion hole, and a permanent magnet 1 of the rotor is disposed to the outer peripheral surface of a rotary shaft 3. Loss in Table 3 and Table 4 shows the difference of losses between a case of using an NdFeB sintered magnet in which a fluorine compound is formed in discontiguous on the surface of thereof and a permanent magnet in which the fluoride-containing layer is formed along the surface thereof.

TABLE 3

| Host phase | Primary coating of surface | Fluorine-containing granular grain boundary phase | Change of loss (%) |
|---|---|---|---|
| $Nd_2Fe_{14}B$ | $Nd, Nd_{95}Fe, Nd_2O_3, Nd_{1.1}Fe_4B_4$ | $BaF_2$ | −0.3 |
| $Nd_2Fe_{14}B$ | $Nd, Nd_{95}Fe, Nd_2O_3, Nd_{1.1}Fe_4B_4$ | $CaF_2$ | −0.2 |
| $Nd_2Fe_{14}B$ | $Nd, Nd_{95}Fe, Nd_2O_3, Nd_{1.1}Fe_4B_4$ | $MgF_2$ | −0.2 |
| $Nd_2Fe_{14}B$ | $Nd, Nd_{95}Fe, Nd_2O_3, Nd_{1.1}Fe_4B_4$ | $SrF_2$ | −0.3 |
| $Nd_2Fe_{14}B$ | $Nd, Nd_{95}Fe, Nd_2O_3, Nd_{1.1}Fe_4B_4$ | $LiF$ | −0.3 |
| $Nd_2Fe_{14}B$ | $Nd, Nd_{95}Fe, Nd_2O_3, Nd_{1.1}Fe_4B_4$ | $LaF_3$ | −0.5 |
| $Nd_2Fe_{14}B$ | $Nd, Nd_{95}Fe, Nd_2O_3, Nd_{1.1}Fe_4B_4$ | $NdF_3$ | −3.2 |
| $Nd_2Fe_{14}B$ | $Nd, Nd_{95}Fe, Nd_2O_3, Nd_{1.1}Fe_4B_4$ | $PrF_3$ | −1.8 |
| $Nd_2Fe_{14}B$ | $Nd, Nd_{95}Fe, Nd_2O_3, Nd_{1.1}Fe_4B_4$ | $SmF_3$ | −1.7 |
| $Nd_2Fe_{14}B$ | $Nd, Nd_{95}Fe, Nd_2O_3, Nd_{1.1}Fe_4B_4$ | $EuF_3$ | −1.5 |
| $Nd_2Fe_{14}B$ | $Nd, Nd_{95}Fe, Nd_2O_3, Nd_{1.1}Fe_4B_4$ | $GdF_3$ | −1.2 |
| $Nd_2Fe_{14}B$ | $Nd, Nd_{95}Fe, Nd_2O_3, Nd_{1.1}Fe_4B_4$ | $TbF_3$ | −2.7 |
| $Nd_2Fe_{14}B$ | $Nd, Nd_{95}Fe, Nd_2O_3, Nd_{1.1}Fe_4B_4$ | $DyF_3$ | −2.1 |
| $Nd_2Fe_{14}B$ | $Nd, Nd_{95}Fe, Nd_2O_3, Nd_{1.1}Fe_4B_4$ | $CeF_3$ | −2.1 |
| $Nd_2Fe_{14}B$ | $Nd, Nd_{95}Fe, Nd_2O_3, Nd_{1.1}Fe_4B_4$ | $HoF_3$ | −1.4 |
| $Nd_2Fe_{14}B$ | $Nd, Nd_{95}Fe, Nd_2O_3, Nd_{1.1}Fe_4B_4$ | $ErF_3$ | −1.4 |
| $Nd_2Fe_{14}B$ | $Nd, Nd_{95}Fe, Nd_2O_3, Nd_{1.1}Fe_4B_4$ | $TmF_3$ | −1.1 |
| $Nd_2Fe_{14}B$ | $Nd, Nd_{95}Fe, Nd_2O_3, Nd_{1.1}Fe_4B_4$ | $YbF_3$ | −0.8 |
| $Nd_2Fe_{14}B$ | $Nd, Nd_{95}Fe, Nd_2O_3, Nd_{1.1}Fe_4B_4$ | $PmF_3$ | −0.4 |
| $Nd_2Fe_{14}B$ | $Nd, Nd_{95}Fe, Nd_2O_3, Nd_{1.1}Fe_4B_4$ | $NdF_3, NdF_2$ | −4.0 |
| $Nd_2Fe_{14}B$ | $Nd, Nd_{95}Fe, Nd_2O_3, Nd_{1.1}Fe_4B_4$ | $NdF_3, NdF_2, Nd(F, O)_3$ | −3.7 |
| $Nd_2Fe_{14}B$ | $Nd, Nd_{95}Fe, Nd_2O_3, Nd_{1.1}Fe_4B_4$ | $NdF_3, Nd(F, O)_2, Nd(F, O)_3$ | −2.7 |
| $Nd_2Fe_{14}B$ | $Nd_{95}Fe$, oxide of rare-earth element | $TbF_3$ | −2.6 |

TABLE 3-continued

| Host phase | Primary coating of surface | Fluorine-containing granular grain boundary phase | Change of loss (%) |
|---|---|---|---|
| $Nd_2Fe_{14}B$ | $Nd_{95}Fe$, oxide of rare-earth element | $DyF_3$ | −1.8 |
| $Nd_2Fe_{14}B$ | $Nd_{95}Fe$, oxide of rare-earth element | $NdF_3, NdF_2$ | −2.5 |
| $Nd_2Fe_{14}B$ | $Nd_{95}Fe$, oxide of rare-earth element | $NdF_3, NdF_2, Nd(F, O)_3$ | −2.1 |
| $Nd_2Fe_{14}B$ | $Nd_{95}Fe$, oxide of rare-earth element | $NdF_3, Nd(F, O)_2, Nd(F, O)_3$ | −2.2 |
| $(ND, Dy)_2Fe_{14}B$ | $(Nd, Dy)_{95}Fe$, oxide of rare-earth element | $TbF_3$ | −2.7 |
| $(ND, Dy)_2Fe_{14}B$ | $(Nd, Dy)_{95}Fe$, oxide of rare-earth element | $DyF_3$ | −2.1 |
| $(ND, Dy)_2Fe_{14}B$ | $(Nd, Dy)_{95}Fe$, oxide of rare-earth element | $NdF_3, NdF_2$ | −2.5 |
| $(ND, Dy)_2Fe_{14}B$ | $(Nd, Dy)_{95}Fe$, oxide of rare-earth element | $NdF_3, NdF_2, Nd(F, O)_3$ | −2.6 |
| $(ND, Dy)_2Fe_{14}B$ | $(Nd, Dy)_{95}Fe$, oxide of rare-earth element | $NdF_3, Nd(F, O)_2, Nd(F, O)_3$ | −2.1 |
| $Nd_2(Fe, Co)_{14}B$ | $Nd_{95}Fe$, oxide of rare-earth element | $TbF_3$ | −2.9 |
| $Nd_2(Fe, Co)_{14}B$ | $Nd_{95}Fe$, oxide of rare-earth element | $DyF_3$ | −2.4 |
| $Nd_2(Fe, Co)_{14}B$ | $Nd_{95}Fe$, oxide of rare-earth element | $NdF_3, NdF_2$ | −2.2 |
| $Nd_2(Fe, Co)_{14}B$ | $Nd_{95}Fe$, oxide of rare-earth element | $NdF_3, NdF_2, Nd(F, O)_3$ | −1.5 |
| $Nd_2(Fe, Co)_{14}B$ | $Nd_{95}Fe$, oxide of rare-earth element | $NdF_3, Nd(F, O)_2, Nd(F, O)_3$ | −2.5 |
| $(Nd, Dy)_2, (Fe, Co)_{14}B$ | $(Nd, Dy)_{95}(Fe, Co)$, oxide of rare-earth element | $TbF_3$ | −2.5 |
| $(Nd, Dy)_2, (Fe, Co)_{14}B$ | $(Nd, Dy)_{95}(Fe, Co)$, oxide of rare-earth element | $DyF_3$ | −1.8 |
| $(Nd, Dy)_2, (Fe, Co)_{14}B$ | $(Nd, Dy)_{95}(Fe, Co)$, oxide of rare-earth element | $NdF_3, NdF_2$ | −2.4 |
| $(Nd, Dy)_2, (Fe, Co)_{14}B$ | $(Nd, Dy)_{95}(Fe, Co)$, oxide of rare-earth element | $NdF_3, NdF_2, Nd(F, O)_3$ | −2.2 |
| $(Nd, Dy)_2, (Fe, Co)_{14}B$ | $(Nd, Dy)_{95}(Fe, Co)$, oxide of rare-earth element | $NdF_3, Nd(F, O)_2, Nd(F, O)_3$ | −2.3 |
| $Nd_2Fe_{14}(B, C)$ | $Nd_{95}Fe$, oxide of rare-earth element | $TbF_3$ | −2.3 |
| $Nd_2Fe_{14}(B, C)$ | $Nd_{95}Fe$, oxide of rare-earth element | $DyF_3$ | −1.5 |
| $Nd_2Fe_{14}(B, C)$ | $Nd_{95}Fe$, oxide of rare-earth element | $NdF_3, NdF_2$ | −2.2 |
| $Nd_2Fe_{14}(B, C)$ | $Nd_{95}Fe$, oxide of rare-earth element | $NdF_3, NdF_2, Nd(F, O)_3$ | −2.1 |
| $Nd_2Fe_{14}(B, C)$ | $Nd_{95}Fe$, oxide of rare-earth element | $NdF_3, Nd(F, O)_2, Nd(F, O)_3$ | −2.1 |
| $Nd_2(Fe, Co, Zr)_{14}B$ | $Nd_2(Fe, Co, Zr, O)_{14}B$, oxide of rare-earth element | $TbF_3$ | −1.5 |

TABLE 4

| Host phase | Primary coating of surface | Fluorine-containing granular grain boundary phase | Change of loss (%) |
|---|---|---|---|
| $Nd_2(Fe, Co, Zr)_{14}B$ | $Nd_2(Fe, Co, Zr, O)_{14}B$, oxide of rare-earth element | $DyF_3$ | −1.2 |
| $Nd_2(Fe, Co, Zr)_{14}B$ | $Nd_2(Fe, Co, Zr, O)_{14}B$, oxide of rare-earth element | $NdF_3, NdF_2$ | −1.3 |
| $Nd_2(Fe, Co, Zr)_{14}B$ | $Nd_2(Fe, Co, Zr, O)_{14}B$, oxide of rare-earth element | $NdF_3, NdF_2, Nd(F, O)_3$ | −1.5 |

TABLE 4-continued

| | | | |
|---|---|---|---|
| $Nd_2(Fe, Co, Zr)_{14}B$ | $Nd_2(Fe, Co, Zr, O)_{14}B$, oxide of rare-earth element | $NdF_3$, $Nd(F, O)_2$, $Nd(F, O)_3$ | −1.6 |
| $Nd_2(Fe, Co, Zr)_{14}B$ | $Nd_2(Fe, Co, Zr, O, H)_{14}B$, oxide of rare-earth element | $TbF_3$ | −1.5 |
| $Nd_2(Fe, Co, Zr)_{14}B$ | $Nd_2(Fe, Co, Zr, O, H)_{14}B$, oxide of rare-earth element | $DyF_3$ | −1.4 |
| $Nd_2(Fe, Co, Zr)_{14}B$ | $Nd_2(Fe, Co, Zr, O, H)_{14}B$, oxide of rare-earth element | $NdF_3$, $NdF_2$ | −1.8 |
| $Nd_2(Fe, Co, Zr)_{14}B$ | $Nd_2(Fe, Co, Zr, O, H)_{14}B$, oxide of rare-earth element | $NdF_3$, $NdF_2$, $Nd(F, O)_3$ | −1.9 |
| $Nd_2(Fe, Co, Zr)_{14}B$ | $Nd_2(Fe, Co, Zr, O, H)_{14}B$, , oxide of rare-earth element | $NdF_3$, $Nd(F, O)_2$, $Nd(F, O)_3$ | −2.1 |
| $Nd_2(Fe, Co, Ga)_{14}B$ | $Nd_{95}(Fe, Co, Ga)$, oxide of rare-earth element | $TbF_3$ | −2.1 |
| $Nd_2(Fe, Co, Ga)_{14}B$ | $Nd_{95}(Fe, Co, Ga)$, oxide of rare-earth element | $DyF_3$ | −2.1 |
| $Nd_2(Fe, Co, Ga)_{14}B$ | $Nd_{95}(Fe, Co, Ga)$, oxide of rare-earth element | $NdF_3$, $NdF_2$ | −2.3 |
| $Nd_2(Fe, Co, Ga)_{14}B$ | $Nd_{95}(Fe, Co, Ga)$, oxide of rare-earth element | $NdF_3$, $NdF_2$, $Nd(F, O)_3$ | −2.3 |
| $Nd_2(Fe, Co, Ga)_{14}B$ | $Nd_{95}(Fe, Co, Ga)$, oxide of rare-earth element | $NdF_3$, $Nd(F, O)_2$, $Nd(F, O)_3$ | −2.6 |
| $Sm_2Fe_{17}$ | $Sm_2(Fe, O)_{17}$, oxide of rare-earth element | $TbF_3$ | −1.1 |
| $Sm_2Fe_{17}$ | $Sm_2(Fe, O)_{17}$, oxide of rare-earth element | $DyF_3$ | −1.2 |
| $Sm_2Fe_{17}$ | $Sm_2(Fe, O)_{17}$, oxide of rare-earth element | $NdF_3$, $NdF_2$ | −1.3 |
| $Sm_2Fe_{17}$ | $Sm_2(Fe, O)_{17}$, oxide of rare-earth element | $NdF_3$, $NdF_2$, $Nd(F, O)_3$ | −1.1 |
| $Sm_2Fe_{17}$ | $Sm_2(Fe, O)_{17}$, oxide of rare-earth element | $NdF_3$, $Nd(F, O)_2$, $Nd(F, O)_3$ | −1.1 |
| $Sm_2(Co, Fe, Cu, Zr)_{17}$ | $Sm(Co, Fe, Cu, Zr)_5$, oxide of rare-earth element | $TbF_3$ | −1.1 |
| $Sm_2(Co, Fe, Cu, Zr)_{17}$ | $Sm(Co, Fe, Cu, Zr)_5$, oxide of rare-earth element | $DyF_3$ | −1.2 |
| $Sm_2(Co, Fe, Cu, Zr)_{17}$ | $Sm(Co, Fe, Cu, Zr)_5$, oxide of rare-earth element | $NdF_3$, $NdF_2$ | −1.3 |
| $Sm_2(Co, Fe, Cu, Zr)_{17}$ | $Sm(Co, Fe, Cu, Zr)_5$, oxide of rare-earth element | $NdF_3$, $NdF_2$, $Nd(F, O)_3$ | −1.1 |
| $Sm_2(Co, Fe, Cu, Zr)_{17}$ | $Sm(Co, Fe, Cu, Zr)_5$, oxide of rare-earth element | $NdF_3$, $Nd(F, O)_2$, $Nd(F, O)_3$ | −1.0 |
| $Sm_2(Co, Fe, Cu, Zr)_{17}$ | $Sm_2(Co, Fe, Cu, Zr, O)_{17}$, oxide of rare-earth element | $TbF_3$ | −1.1 |
| $Sm_2(Co, Fe, Cu, Zr)_{17}$ | $Sm_2(Co, Fe, Cu, Zr, O)_{17}$, oxide of rare-earth element | $DyF_3$ | −1.5 |
| $Sm_2(Co, Fe, Cu, Zr)_{17}$ | $Sm_2(Co, Fe, Cu, Zr, O)_{17}$, oxide of rare-earth element | $NdF_3$, $NdF_2$ | −1.4 |
| $Sm_2(Co, Fe, Cu, Zr)_{17}$ | $Sm_2(Co, Fe, Cu, Zr, O)_{17}$, oxide of rare-earth element | $NdF_3$, $NdF_2$, $Nd(F, O)_3$ | −1.1 |
| $Sm_2(Co, Fe, Cu, Zr)_{17}$ | $Sm_2(Co, Fe, Cu, Zr, O)_{17}$, oxide of rare-earth element | $NdF_3$, $Nd(F, O)_2$, $Nd(F, O)_3$ | −0.7 |
| $Sm_2Fe_{17}N_3$ | $Sm_2Fe_{17}(N, O)_3$, oxide of rare-earth element | $TbF_3$ | −1.1 |
| $Sm_2Fe_{17}N_3$ | $Sm_2Fe_{17}(N, O)_3$, oxide of rare-earth element | $DyF_3$ | −0.9 |
| $Sm_2Fe_{17}N_3$ | $Sm_2Fe_{17}(N, O)_3$, oxide of rare-earth element | $NdF_3$, $NdF_2$ | −0.7 |
| $Sm_2Fe_{17}N_3$ | $Sm_2Fe_{17}(N, O)_3$, oxide of rare-earth element | $NdF_3$, $NdF_2$, $Nd(F, O)_3$ | −0.7 |
| $Sm_2Fe_{17}N_3$ | $Sm_2Fe_{17}(N, O)_3$, oxide of rare-earth element | $NdF_3$, $Nd(F, O)_2$, $Nd(F, O)_3$ | −0.8 |

It was confirmed that the effect of reducing the loss was provided in cases of any fluoride-containing layers of the sintered magnets. Such effect of reducing the loss develops remarkably also at the number of rotation lower than the number of rotation of 1000 rpm, and in a case of containing much harmonic wave components in the induced voltage waveform or in a case where the gap magnetic flux density waveform contains waveform distortions.

The present invention can suppress the lowering of energy product in R—Fe—B (R: rare-earth element) series or R—Co series magnets, to reduce the eddy current loss, and can suppress the eddy current loss of magnets exposed to fluctuating magnetic fields such as AC magnetic fields, and attain reduction of heat generation accompanied to the eddy current loss, and is applicable to rotary machines such as surface magnet motors, buried magnet motors, or MRI in which magnets are arranged in high frequency magnetic fields, current-limiting devices, etc.

As described above, in the permanent magnet comprising a ferromagnetic material of containing at least one kind of rare-earth element, the permanent magnet can have the effect of reducing loss by forming a layer with at least one kind of alkaline-earth element or rare-earth element and fluorine at a portion of grain boundary or near the powder surface of the ferromagnetic material. Therefore, the permanent magnet is applicable to magnetic circuits exposed to high frequency magnetic fields, and it can increase the overall efficiency, and expect the effect of reducing the noise in the magnetic circuits due to the effect of reducing loss, and the effect of suppressing heat generation.

EXAMPLE 4

Figure 3:
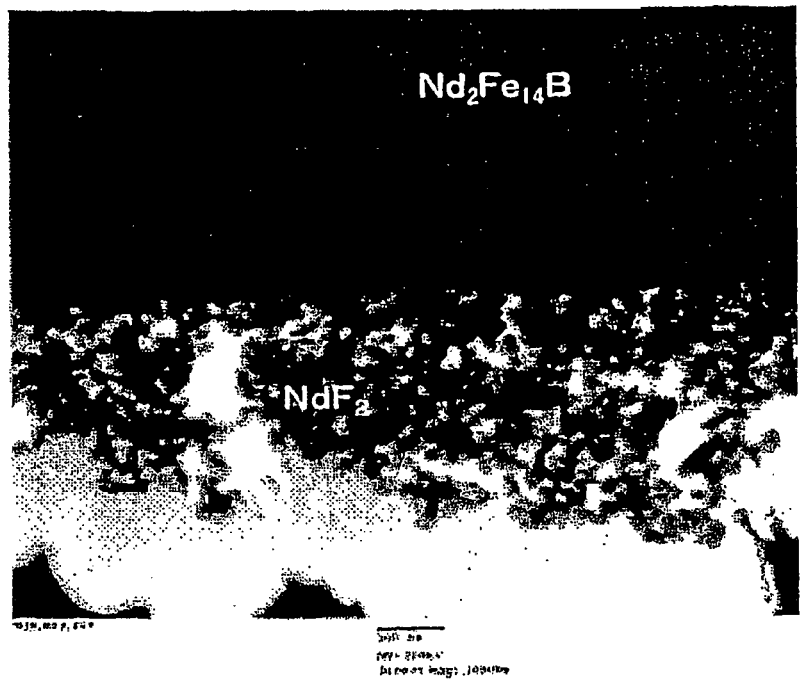
FIG. 3 shows TEM images near the boundary between $Nd_2Fe_{14}B$ and $NdF_2$ (example 1).
Figure 4:
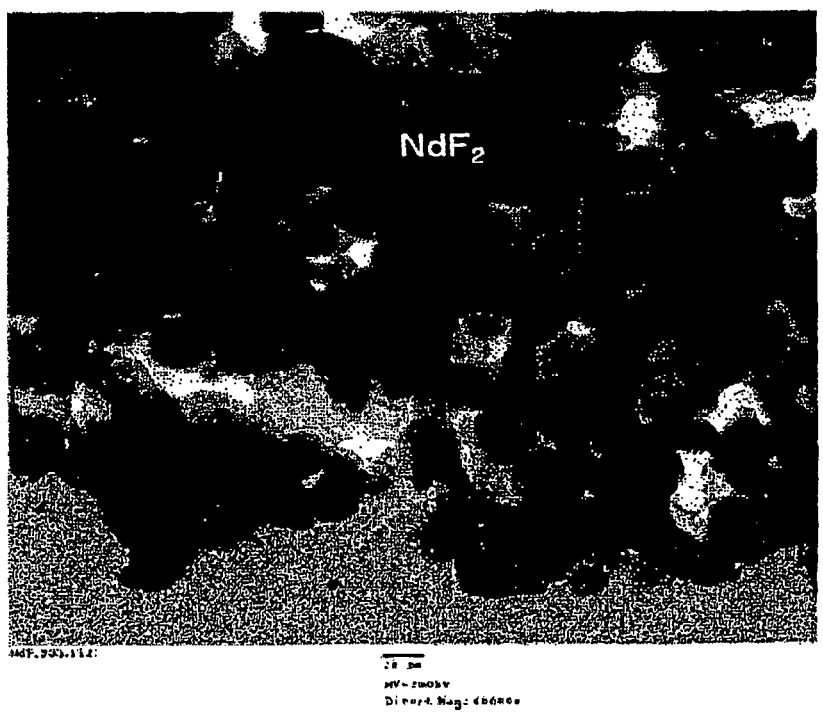
FIG. 4 shows TEM images near the boundary between $Nd_2Fe_{14}B$ and $NdF_2$ (example 2).

A powder having a powder diameter of from 1 to 100 μm and comprising $Nd_2Fe_{14}B$ as a main phase is used as a magnetic powder. A coating comprising an amorphous or non-amorphous $NdF_3$ as a main ingredient is formed partially or entirely on the surface of the magnetic powder by using $NdF_3$ gelled with a solvent. In a case of coating $NdF_3$ on the magnetic powder, a solvent giving less magnetical or structural damages to the magnetic powder is selected and used. The thickness of $NdF_3$ formed by coating is from 1 to 10,000 nm in average. Even when $NdF_2$ is mixed into $NdF_3$, it gives no undesired effects on the magnetic characteristics of the magnetic powder. Near the boundary between the fluoride layer and the magnetic powder, oxides containing rare-earth elements and carbon or oxygen-containing compounds as trace amount of impurities may be present. FIG. 3 and FIG. 4 show the result of cross sectional TEM observation in a case of forming $NdF_2$ to a powder comprising $Nd_2Fe_{14}B$ as a main phase. FIG. 3 shows TEM images near the boundary between $Nd_2Fe_{14}B$ and $NdF_2$. Even the $NdF_2$ coating is formed, no remarkable damages are observed on the $Nd_2Fe_{14}B$. It can be seen from FIG. 3 and FIG. 4 that the grain size of $NdF_2$ formed to $Nd_2Fe_{14}B$ is from 10 to 20 nm. The grains are grown to decrease the defects density by a heat treatment at 400° C. or higher.

Gelled materials, identical with and usable like $NdF_2$ fluoride include $BaF_2$, $CaF_2$, $MgF_2$, $SrF_2$, LiF, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, $LuF_3$, $LaF_2$, $NdF_2$, $PrF_2$, $SmF_2$, $EuF_2$, $GdF_2$, $TbF_2$, $DyF_2$, $CeF_2$, $HoF_2$, $ErF_2$, $TmF_2$, $YbF_2$, $LuF_2$, $YF_3$, $ScF_3$, $CrF_3$, $MnF_2$, $MnF_3$, $FeF_2$, $FeF_3$, $CoF_2$, $CoF_3$, $NiF_2$, $ZnF_2$, $AgF$, $PbF_4$, $AlF_3$, $GaF_3$, $SnF_2$, $SnF_4$, $InF_3$, $PbF_2$, and $BiF_3$, or composite fluorine-compounds formed by mixing two or more of the fluorine-compounds described above, a fluorine-compounds of a composition indicated as MxFy in which M represents one or more metal elements, X is 1 to 5 and Y is 1 to 10. A light element such as oxygen, carbon, nitrogen or boron may be mixed for a portion of F. Alternatively, at least one kind of amorphous fluorine-compound, which has a composition equivalent with the fluorine-containing compound or alloy described above, may be formed on the surface of powder comprising $Nd_2Fe_{14}B$ as a main phase. According to such a formation, it makes possible to provide any of the effects of decreasing the temperature coefficient of the coercive force, increasing the coercive force, decreasing the temperature coefficient of the residual magnetic flux density or increasing Hk, improving the squareness of demagnetization curve, improving corrosion resistance or suppressing oxidation. These fluorides may be ferromagnetic or non-ferromagnetic at 20° C. By coating one of such fluorides the magnetic powder using a gel, the coverage of the fluoride on the surface of the magnetic powder can be increased compared with a case of mixing the fluoride powder into the magnetic powder without using the gel. Accordingly, the effect described above develops more remarkably in the coating by using the gel than in a case of mixing with the fluoride powder. The effect can be maintained even in a case where oxygen and constituent elements for the host phase are contained in the fluoride. It is possible to mold a bond magnet by preparing a compound in which the magnetic powder with the fluoride layer is mixed with an organic resin such as an epoxy resin, polyimide resin, polyamide resin, polyamideimide resin, CHELIMIDE resin, maleimide resin, polyphenyl ether, polyphenylene sulfide alone or a composite material of epoxy resin, polyamide resin, polyamideimide resin, CHELIMIDE resin, and maleimide resin etc., and by molding the compound under magnetic fields or in the absence of magnetic fields. For the bond magnet using the $Nd_2Fe_{14}B$ powder coated with the gel, it can be confirmed any the effect of decreasing the temperature coefficient of the coercive force, increasing the coercive force, decreasing the temperature coefficient of the residual magnetic flux density or increasing Hk, improving the squareness of demagnetization curve, improving corrosion resistance or suppressing oxidation in the same manner as for the effect of the magnetic powder. It is considered that the effects are attributable to the stabilization of the magnetic domain structure, increase of the anisotropy in the vicinity of the fluoride and prevention of oxidation of the magnetic powder by the fluoride, by the formation of the fluoride layer.

EXAMPLE 5

A powder having a diameter of from 1 to 100 μm and comprising $Nd_2Fe_{14}B$, $Sm_2Fe_{17}F_3$, or $Sm_2Co_{17}$ as a main phase is used for a magnetic powder. A coating comprising an amorphous or non-amorphous $REF_3$ as a main ingredient is formed partially or entirely on the surface of the magnetic powder by using a gelled material containing $REF_3$ (RE: rare-earth element) with a solvent. The coating thickness of $REF_3$ is 1 to 10,000 nm in average. Even when $REF_2$ is mixed with $REF_3$, this does not gives undesired effect on the magnetic characteristics of the magnetic powder. After coating, the solvent used for preparation of the gel is removed. Near the boundary between the fluoride layer and the magnetic powder, oxides containing rare-earth element, compounds containing carbon or oxygen as trace amounts of impurities, or a rare-earth rich phase may be present. The composition of the fluoride layer can be varied by controlling the composition and the coating condition of the gel within a range of $REF_x$ (X=1 to 3). By forming at least one kind of fluorine-compound containing ingredient in an amorphous state or a non-amorphous state of an equivalent composition to the surface of the magnetic powder, any of the effect of decreasing the temperature coefficient of the coercive force, increasing the coercive force, decreasing the temperature coefficient of the residual magnetic flux density or increasing Hk, improving the squareness of demagnetization curve, improving corrosion resistance or suppressing oxidation can be obtained. It is possible to mold a bond magnet by preparing a compound in which the magnetic powder with the fluoride layer is mixed with an organic resin such as an epoxy resin, polyimide resin, polyamide resin, polyamideimide resin, CHELIMIDE resin, maleimide resin, polyphenyl ether, polyphenylene sulfide alone or a composite material of epoxy resin, polyamide resin, polyamideimide resin, CHELIMIDE resin, and maleimide resin etc., and by compression molding or injection molding of the compound. Alternatively, a molded magnet with the magnetic powder volume ratio of 80% to 99% can be prepared by compression molding, heat molding and extrusion molding of the magnetic powder with the fluoride layer described above by using a molding die. In the molded magnet, a layerous fluoride is formed at the grain boundary. For the bond magnet using $Nd_2Fe_{14}B$, $Sm_2Fe_{17}N_3$ or $Sm_2Co_{17}$ powder coated with the gel described above, any of the effects of decreasing the temperature coefficient of the coercive force, increasing the coercive force, decreasing the temperature coefficient of the residual magnetic flux density or increasing Hk, improving the squareness of demagnetization curve, improving corrosion resistance or suppressing oxidation can be confirmed. While various elements are added in view of the application use to the $Nd_2Fe_{14}B$, $Sm_2Fe_{17}N_3$ or $Sm_2Co_{17}$ powder, the fluoride can be formed in the use of any additive elements and the effects described above can be confirmed. Further, the tissue, crystal structure, grain boundary, grain size, etc. of the $Nd_2Fe_{14}B$, $Sm_2F_{17}N_3$ or $Sm_2Co_{17}$ magnetic powder are controlled, for example, by the addition of metal elements containing rare-earth element. Accordingly, phases other than the main phase are formed in addition to the main phase by the additive elements or the magnet preparing process. In a case of the NdFeB series, boride, rare-earth rich phase and/or iron rich phase are present, and the gelled material can be coated also to the surface of powder formed with such phase and oxides, to form the layerous fluoride.

EXAMPLE 6

When at least one of $BaF_2$, $CaF_2$, $MgF_2$, $SrF_2$, LiF, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, $LuF_3$, $LaF_2$, $NdF_2$, $PrF_2$, $SmF_2$, $EuF_2$, $GdF_2$, $TbF_2$, $DyF_2$, $CeF_2$, $HoF_2$, $ErF_2$, $TmF_2$, $YbF_2$, $LuF_2$, $YF_3$, $ScF_3$, $CrF_3$, $MnF_2$, $MnF_3$, $FeF_2$, $FeF_3$, $CoF_2$, $CoF_3$, $NiF_2$, $ZnF_2$, $AgF$, $PbF_4$, $AlF_3$, $GaF_3$, $SnF_2$, $SnF_4$, $InF_3$, $PbF_2$, and $BiF_3$ is formed on the surface of a magnetic body containing at least one kind of rare-earth element, improvement of the corrosion resistance or increase of the resistivity can be attained. The fluorine-containing compound is formed by applying a heat treatment at a temperature of 100° C. or higher after coating a fluorine-containing gel or sol to the surface of the molded body comprising $Nd_2Fe_{14}B$ as a main phase. The thickness of the fluorine-containing layer is from 1 to 10,000 nm. At the thickness of 1 nm or more, a fluorine-containing layer having a specific resistivity value of $1\times10^4$ Ωcm or higher is obtained. Since the coating to be the fluorine-containing layer is stable at 1000° C. or lower, it is possible to prevent oxidation of a magnet material to be used at high temperature. In order to decrease pinholes, the fluoride layer may be formed with a multi-layered structure or a stacking structure of a metal series coating (Ni, Cr, Cu, etc.) and the fluorine-containing coating. According to such a structure, it is also effective to ensure the corrosion resistance. The fluorine compound grown in the fluorine containing layer may also contain a light metal such as oxygen, nitrogen, and boron. When $NdF_3$ is coated by using the gel or sol on the $Nd_2Fe_{14}B$ molded product and heat-treated at a temperature of 100° C. or higher, a coating mainly comprising $NdF_3$ can be formed. The coating is from 1 to 10,000 nm and has a resistance value of $1\times10^4$ Ωcm. Further, when a heat treatment is applied at 400° C. or higher, $NdF_2$ is grown near the boundary with $Nd_2Fe_{14}B$. The coating is rendered less peeling and the resistance value is increased further due to $NdF_2$. Also in a case where an Ni coating is present on the surface of the molded product, $NdF_3$ can be formed in the same manner to obtain a coating having a resistance value of $1\times10^4$ Ωcm.

EXAMPLE 7

A magnetic circuit is prepared by using $Nd_2Fe_{14}B$ as a hard magnetic material and Fe as a soft magnetic material. An Fe powder is provided on the periphery of provisionally molded $Nd_2Fe_{14}B$ in a die, and molded at a pressing pressure of 1 t/cm² or higher. These powders are coated at the surface with a fluorine-containing material. After pressing, they are heated in a heat treatment furnace to bond the coating layers to each other. The temperature is from 500° C. to 120° C. Diffusion of fluoride is caused, and the fluoride on the surface of $Nd_2Fe_{14}B$ and Fe powders are bonded to be integrated. Fabrication after the integration differs depending on the design of magnetic circuits to be used. Due to the use of the coating material, it has a feature that the corrosion resistance is high and the eddy current loss is low even when the $Nd_2Fe_{14}B$ is on the surface of the magnetic circuits. The hard magnetic materials and soft magnetic materials applicable to the magnet of the present invention are as follows. The hard magnetic materials, for example, are rare-earth element-3d transition metal series or rare-earth element-3d transition metal-semi-metal series such as $Nd_2Fe_{14}B$, $Sm_2Co_{17}$, $SmCo_5$, NdFeSi series, NdFeAl series and SmFeN series etc. The soft magnetic materials, for example, are Fe series, FeCo series, Fe—Si series, Fe—C series, Ni series, and Fe—Ni series etc. Metal series magnetic powder containing at least one rare-earth element other than that shown in this Example 7, change the magnetic characteristics since the rare-earth element is liable to be oxidized. But the fluoride is effective as a layer for preventing oxidation of the rare-earth element. For the fluoride layer used in this example, the effect of preventing oxidation can be expected to all metal series magnetic powders including the rare-earth elements and it can provide the effect in suppressing corrosion, suppressing the corruption and in the stability for corrosion potential.

EXAMPLE 8

A host alloy comprising rare-earth element, iron and boron is carried out by vacuum fusion. The alloy is coarsely pulverized and then finely pulverized in an inert gas to obtain a powder of an average grain size from 0.1 to 10 μm. The powder shape may be any of spherical, indefinite, tabular shape or the like. A gelled solution containing a fluorine compound is coated on the powder. The type of the impurity and the content of the impurity in the solvent, are restricted such that oxidation of the powder can be suppressed. The solution is used in an amount calculated based on the weight of the powder and coated on the powder. After the coating, the solvent is removed by heat treatment. $DyF_3$ is coated by 100 nm in average and when it is heat-treated in vacuum at a temperature of 500° C., a portion of $DyF_3$ is transformed into $DyF_2$. By the growth of $DyF_2$, the magnetic characteristics on the powder surface are changed to result in improvement of the squareness of the demagnetization curve and an increase in the residual magnetic flux density. Also in a case of the $Sm_2Co_{17}$ magnetic powder, structural change of $DyF_3$ to $DyF_2$ is observed, and the squareness of the demagnetization curve is improved by applying a heat treatment.

EXAMPLE 9

Alloying of rare-earth element and iron or cobalt is carried out by vacuum fusion. The alloy is coarsely pulverized and then finely pulverized in an inert gas, and a fine powder of a grain size of 0.1 μm or less is obtained by using, for example, a ball mill. The conditions for ball milling comprise treatment in alcohol, at room temperature, under 500 to 1000 rpm, and use of fluoride coated ball. Before ball milling, the rare-earth iron powder is coated with $DyF_3$. The thickness of the coating is 1/10th or less of the average diameter of the magnetic powder. By ball milling the coated magnetic powder, a rare-earth iron fluoride compound is formed. The rare-earth iron fluoride compound contains 1/10th at % of fluorine, and has magnetic characteristics with the coercive force of 10 kOe or more and the residual magnetic flux density of from 0.5 T to 1.2 T. The magnetic powder containing the rare-earth iron fluoride compound described above can be used as the raw material for the bond magnet.

EXAMPLE 10

After forming a coating of 1 to 1000 nm containing a fluorine-compound such as $BaF_2$, $CaF_2$, $MgF_2$, $SrF_2$, LiF, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, $LuF_3$, $LaF_2$, $NdF_2$, $PrF_2$, $SmF_2$, $EuF_2$, $GdF_2$, $TbF_2$, $DyF_2$, $CeF_2$, $HoF_2$, $ErF_2$, $TmF_2$, $YbF_2$, $LuF_2$, $YF_3$, $ScF_3$, $CrF_3$, $MnF_2$, $MnF_3$, $FeF_2$, $FeF_3$, $CoF_2$, $CoF_3$, $NiF_2$, $ZnF_2$, AgF, $PbF_4$, $AlF_3$, $GaF_3$, $SnF_2$, $SnF_4$, $InF_3$, $PbF_2$, and $BiF_3$, for example, to NdFeB series, SmFeN series, or SmCo series magnetic powder, and then forming the magnetic powder into aerosol and depositing the same to a peelable material, magnetic powder can be formed. A thick film obtained by optimizing the gas flow rate, the deposition rate and the injecting speed of the aerosol is within a range from 100 μm to 10,000 μm. According to $Nd_2Fe_{14}B$ magnetic powder in which the fluorine compound is 10 vol % or less, the thick film with the coercive force of from 10 kOe to 35 kOe, the residual magnetic flux density of from 0.6 to 1.2 T and the specific resistivity of from 1 mΩcm to 100 mΩcm can be formed. The magnetic powder of 1 to 500 μm powder grain size obtained by pulverization exhibits substantially the same characteristics. By the use of the aerosol process, the fluorine-containing coating described above can be formed on the surface of the molded magnet and the surface of the molded magnet can be coated with less peeling coating of high resistance. $Nd_2Fe_{14}B$ powder with the coating mainly containing the fluorine-compound, which is prepared by coating process and aerosol process, exhibits high resistance at a temperature of 500° C. or lower, and also the corrosion resistance is improved compared with the powder with no coating.

What is claimed is:

1. A rare-earth sintered magnet comprising:
   a host phase of a NdFeB series ferromagnetic material containing Nd as at least one kind of rare-earth element,
   a primary coating being formed on a surface of the host phase substantially along an outer periphery of the host phase, the primary coating being constituted by a rare-earth element containing layer having rare-earth element concentration higher than that of the host phase, and
   a fluorine-containing layer containing rare-earth element and fluorine having a fluorine concentration higher than that of the host phase and containing 10 atom % or more of fluorine, the fluorine-containing layer being formed on the primary coating in a continuous layer,
   wherein the average thickness of the fluorine-containing layer is thicker than that of the primary coating, and which is 1 nm to 10000 nm.

2. The rare-earth sintered magnet according to claim 1, wherein the fluorine-containing layer contains 50 atom % or more of fluorine.

3. The rare-earth sintered magnet according to claim 1, wherein the host phase, the primary coating, and the fluorine-containing layer have been heat treated at a temperature of from 600° C. to 1200° C.

4. A rotor of an electric using the rare-earth sintered magnet according to claim 1.

* * * * *